INVENTOR
SETSUO YAMAMOTO
BY Paul M. Craig, Jr.
ATTORNEY

INVENTOR
SETSUO YAMAMOTO
BY Paul M. Craig, Jr.
ATTORNEY

United States Patent Office 3,327,061
Patented June 20, 1967

3,327,061

RADIO RECEIVERS WITH CHANGE-OVER BETWEEN FM STEREO AND FM MONAURAL SIGNALS

Setsuo Yamamoto, Yokohama, Japan, assignor to Hitachi, Ltd., Tokyo, Japan, a corporation of Japan Filed Nov. 5, 1964, Ser. No. 409,108
Claims priority, application Japan, Nov. 12, 1963, 38/60,381
3 Claims. (Cl. 179—15)

This invention relates to detecting systems for FM stereo broadcast signals, and more particularly to radio receivers in which the detecting circuits are automatically changed over appropriately according to whether the received signals are of stereo broadcast or monaural broadcast.

An FM stereo broadcasting system is known, in which left and rights signals L and R are converted to a sum signal $(L+R)$ and a difference signal $(L-R)$, and a sub-carrier signal is amplitude modulated by the difference signal $(L-R)$ for obtaining a modulated signal with the sub-carrier wave suppressed, the signal frequency band thereof being arranged in the upper band of the sum signal $(L+R)$, and the above two signals are used for frequency modulating the main carrier wave for transmission thereof.

In such an FM stereo broadcasting system as shown in FIG. 1 of the accompanying drawings, for example $(L+R)$ signal 1 of a band from 50 c./s. to 15 kc., modulated signal 2, ranging from 23 kc. to 53 kc, obtained by amplitude modulation of sub-carrier wave of 38 kc., with the sub-carrier wave suppressed, and a pilot signal 3 of 19 kc. interposed between the above two signal bands, are used for frequency modulating the main carrier wave for transmission.

When the monaural signal is transmitted, the main carrier wave is frequency modulated for transmission with a single signal which is equivalent to $(L+R)$ signal.

The present invention relates to a system for changing over the detecting circuit, for detecting and separating left signal L and right signal R from FM stereo signal as mentioned above, and for preparing the detecting circuit appropriately when the monaural signal is received, instead of the stereo signal.

An object of the present invention is to provide a system for changing over the receiver circuit for stereo detection or monaural receiving according to whether the received signal is a stereo signal or a monaural signal, whereby the SN ratio during monaural signal reception is prevented from being lowered by virtue of the presence of stereo detector circuit.

Another object of the present invention is to provide a system automatically changing over the receiver circuit into monaural receiving state even when the stereo signal is received, provided that the stereo signal has not sufficient signal strength to reproduce enough stereo sound effect, whereby the SN ratio is prevented from being lowered by the stereo detector detecting idly any stereo signal having no stereo effect.

There are other objects and particularities of the present invention, which will be made obvious from the following detailed description with reference to the accompanying drawings, in which.

Figures 1, 2:
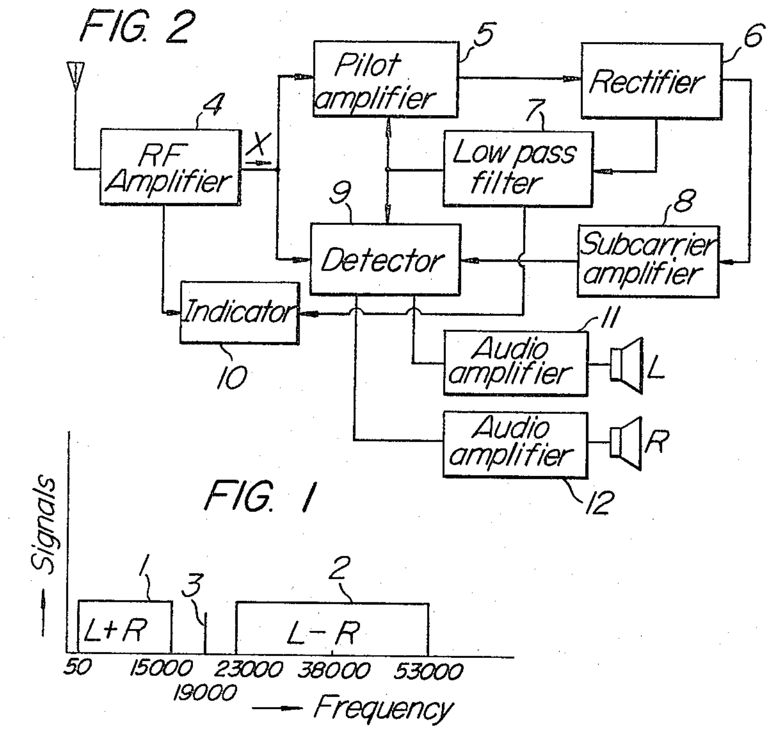
FIG. 1 shows an example of frequency spectrum of FM stereo broadcast signal.
FIG. 2 is a block diagram of an FM broadcast receiver embodying the present invention.

Referring to FIG. 2, the system comprises a high frequency amplifier 4 consisting of frequency converter, intermediate frequency amplifier, and frequency discriminator, a pilot signal amplifier 5, a rectifying circuit 6, and a low-pass filter 7. The pilot signal amplifier 5 is explained in detail hereinafter, and cooperates with rectifier circuit 6 and low-pass filter 7 forming a feed-back circuit, for providing zero output for input signal below a predetermined level and a definite output for input signal above the predetermined level, thus assuming two stable states either when the output is zero or has a definite value. Therefore, the amplifier 5 is hereinafter called "bistable amplifier." The system further comprises a demodulating sub-carrier amplifier 8, a signal detecting circuit 9, an indicator circuit 10, and low frequency amplifiers 11 and 12.

When a stereo broadcast signal is received, the received signal is demodulated by the frequency discriminator included in high frequency amplifier 4, and the output signal $x$ of high frequency amplifier 4 is $$x=(L+R)+(L-R)\cos(2\pi\times 38{,}000)+b\cos(2\pi\times 19{,}000)t \qquad (1)$$

The first term of above equation is the sum signal of left and right signals L and R, the second term is the sub-carrier wave of 38 kc. amplitude modulated with the difference signal $(L-R)$, and the third term is the pilot signal component of 19 kc. The pilot signal is applied to bistable amplifier 5, while the remaining signal is applied to stereo signal detector circuit 9. When the signal $x$ is of enough strength and the pilot signal applied to bistable amplifier 5 is above a predetermined level, the output of amplifier 5 has a definite value, and is rectified by rectifier circuit 6. Thus, direct current voltage is applied to signal detecting circuit 9 through low-pass filter 7. By the above D.C. voltage, the detector circuit 9 is changed over for stereo detection.

Referring to FIG. 1, since 38 kc. signal component appears in the output of rectifier circuit 6 as higher harmonics of 19 kc., this component is amplified by amplifier 8 for application thereof to detector circuit 9 as demodulating sub-carrier, and the detector circuit 9 changed over for stereo detection by the above-mentioned D.C. voltage acts to detect the stereo signal and separate the same into left and right signals L and R.

Of the sound signals separated by detector circuit 9, left signal L is amplified by low frequency amplifier 11 and reproduced by speaker L, while right signal R is amplified by low frequency amplifier 12 and reproduced by speaker R.

The indicator circuit 10 gives a tuning indication whether or not the tuning circuit of high frequency amplifier 4 is tuned to the broadcast wave, by signal from the amplifier 4, and receives D.C. voltage from low-pass filter 7 to indicate that the receiver is in stereo receiving state.

When a monaural signal is received, or when a stereo signal received has not sufficient signal strength, the output of bistable amplifier 5 is zero, and D.C. voltage is not applied to detector circuit 9. As a result, the latter is changed over to monaural signal reception, and sub-carrier amplifier 8 is disconnected from detector circuit 9. The received signal is demodulated by the frequency discriminator included in high frequency amplifier 4, and applied to low frequency amplifiers 11 and 12, through detector circuit 9. Thus, the signal is reproduced by both speakers L and R. D.C. voltage is not supplied from low-pass filter 9 to indicator circuit 10, but the signal from high frequency amplifier 4 only is applied to the latter for tuning indication.

Figures 3, 4:
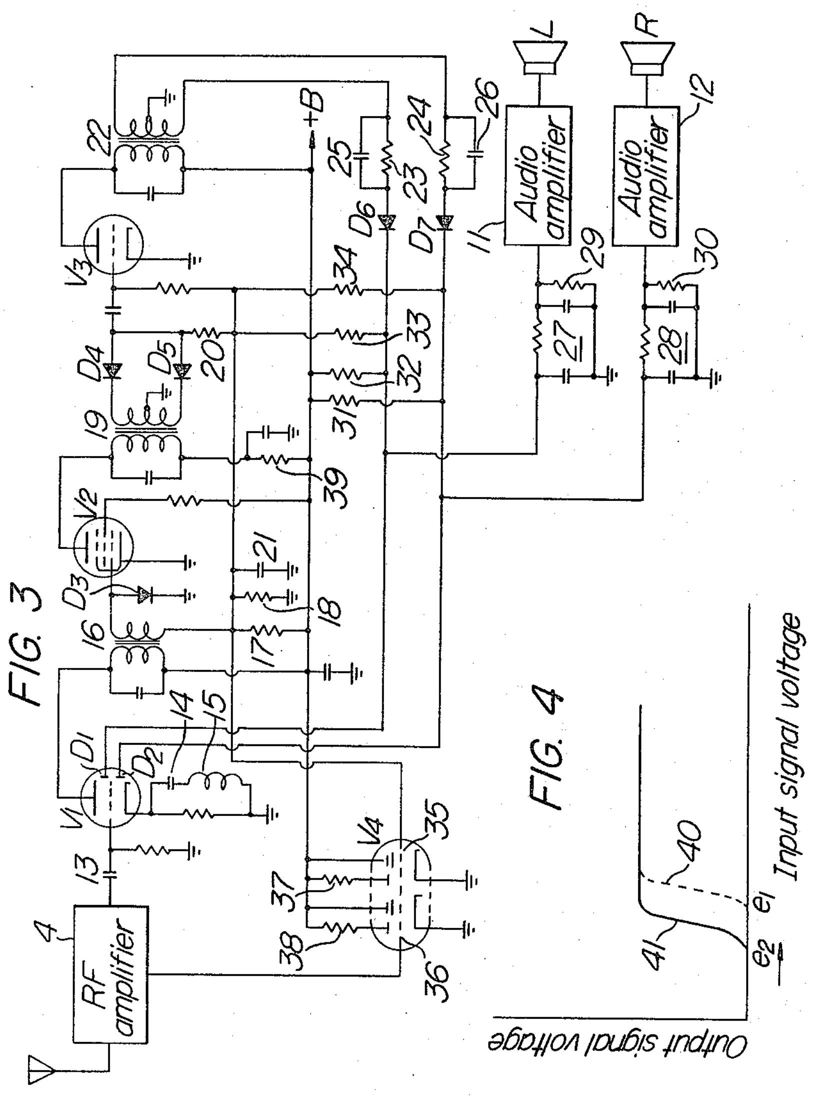
FIG. 3 is a diagrammatic representation of an example of concrete circuit of the same.
FIG. 4 is a curve diagram for explaining the operation of bistable amplifier used therein.

Referring now to FIG. 3, a duplex-diode triode $V_1$ having two diodes $D_1$ and $D_2$ therein has its control grid connected to the output end of high frequency amplifier 4 through a capacitor 13, and its cathode connected to 19 kc. series resonance circuit consisting of a capacitor 14 and an inductance coil 15. The anode of triode $V_1$ is connected to a transformer 16 of which the primary side is resonant with 19 kc. A vacuum tube $V_2$ constituting a bistable amplifier has its control grid connected to one end of the secondary winding of transformer 16, the other end of secondary winding being connected to a potential divider consisting of resistors 17 and 18, and the arrangement is such that positive potential is applied to the control grid of vacuum tube $V_2$. Between the control grid and cathode of vacuum tube $V_2$ is connected a diode $D_3$ which, however, may be omitted. The anode of vacuum tube $V_2$ is connected to one end of the primary winding of transformer 19, the other end thereof being connected to electrical source through a resistor 39. The secondary side of transformer 19 is connected to diodes $D_4$ and $D_5$, the output sides of which are coupled with the grid of vacuum tube $V_3$ constituting a sub-carrier amplifier, and also connected to one end of resistor 20, the other end of which is connected to a capacitor 21 forming a low-pass filter, and to resistor 18.

To the anode of vacuum tube $V_3$ is connected a transformer 22 resonant with 38 kc., both ends of the secondary winding of which are connected to anodes of diodes $D_6$ and $D_7$, respectively, through resistors 23 and 24, and capacitors 25 and 26, respectively, the mid-point of the secondary winding being connected to the ground. The cathodes of diodes $D_6$ and $D_7$ are connected to the anodes of diodes $D_1$ and $D_2$, respectively, and the common joint points of the respective two diodes in series connection are connected to load resistors 29 and 30, respectively, through low-pass filters 27 and 28, and also to low frequency amplifiers 11 and 12, respectively. The above-mentioned common joint points are also connected to positive supply terminals +B through resistors 31 and 32, respectively, and also to the resistor 18 through resistors 33 and 34, respectively. One end of resistor 18 is connected to control grid 35 of vacuum tube $V_4$ forming an indicator circuit. The vacuum tube $V_4$ is a multi unit tube having two control grids 35 and 36, two anodes and cathodes, and target electrodes, and the other control grid 36 is connected to the automatic volume control circuit or automatic gain control circuit, known per se, of high frequency amplifier 4. The two anodes of tube $V_4$ are connected to the electric source through resistors 37 and 38, respectively, and the target electrodes are connected direct to the electric source, the cathodes being connected direct to the ground.

In operation, positive potential is applied to the control grid of vacuum tube $V_2$ by virtue of potential divider 17, 18, and grid current flows in short-circuited condition between the control grid and cathode of tube $V_2$. As a result, large anode current flows through a resistor 39, with a large voltage drop thereacross. Consequently, the anode potential drops, and vacuum tube $V_2$ has no amplification effect. Diode $D_3$ may be used for facilitating short-circuited condition between the grid and cathode. Thus, with positive potential applied to the control grid, of vacuum tube $V_2$ diode $D_3$ provides extremely low impedance to insure the short-circuiting. It is to be understood, however, that diode $D_3$ may be omitted, because the grid-cathode space may effectively be short-circuited by the grid current.

If an input signal is applied to the grid in the above-described condition and the level of input signal is gradually raised, the grid current ceases to flow when the peak value of signal has become high enough to render the grid potential negative, and an output signal appears on the anode. This output is rectified by diodes $D_4$ and $D_5$, with the D.C. component flowing through resistor 18 to cancel the positive potential applied to resistor 18 from +B source, for rendering the grid potential of tube $V_2$ negative. The grid current is thus interrupted, with the anode current decreased, and vacuum tube $V_2$ starts having amplification effect. When a certain stable point has been reached, vacuum tube $V_2$ becomes able to provide an output for input signals above a predetermined level. Even with a higher level of input signal, negative potential feed back from diodes $D_4$ and $D_5$ to the grid controls the amplification factor of vacuum tube $V_2$ for keeping the output thereof constant.

FIG. 4 shows such operating characteristics of vacuum tube $V_2$. As shown by dotted line 40, output appears at input signal voltage $l_1$, which is substantially constant for higher input signal voltages. If the input signal voltage is lowered gradually from above $l_1$, the constant output condition is maintained until the voltage is further lowered from $l_1$ to $l_2$, as shown by solid line 41, at which point the output becomes zero.

When a stereo broadcast signal is received by the receiver of FIG. 3, stereo composite signal X shown by Equation 1 appears at the output side of high frequency amplifier 4, and is applied to the grid of vacuum tube $V_1$ through capacitor 13. The pilot signal component of composite signal X applied to vacuum tube $V_1$ is selectively amplified by transformer 16 tuned to 19 kc., and applied to vacuum tube $V_2$ as input signal. Vacuum tube $V_2$ being a bistable amplifier, it produces a constant output if the pilot signal is above the predetermined level, and the output signal is rectified by diodes $D_4$ and $D_5$, with a constant negative voltage appearing across resistor 18. Since the output signal of bistable amplifier $V_2$ is full-wave rectified by diodes $D_4$ and $D_5$, the rectified output signal becomes 38 kc. signal, which frequency is twice the pilot signal frequency, 19 kc. This output signal is amplified by vacuum tube $V_3$, and applied to diodes $D_6$ and $D_7$ as a 38 kc. demodulating sub-carrier signal.

On the other hand, the remaining component of signal X from which the pilot signal has been removed by the series resonant circuit of capacitor 14 and inductance coil 15, is applied to diodes $D_1$ and $D_2$. In this case, the negative voltage appearing across resistor 18 is applied to the common joint point of diodes $D_1$ and $D_6$ and that of diodes $D_2$ and $D_7$, through respective resistors 33 and 34, fo cancelling the positive potentials applied to these joint points from +B source through respective resistors 31 and 32. As a result, diodes $D_6$ and $D_7$ are rendered conductive. Thus, the signal detecting circuit consisting of diodes $D_1$, $D_2$, $D_6$ and $D_7$ is supplied with stereo signal from the side of diodes $D_1$, $D_2$ and sub-carrier signal from the side of diodes $D_6$, $D_7$. During positive half cycles of the sub-carrier signal, diode $D_1$ is rendered conductive, and the left signal in stereo composite signal supplied to the grid of vacuum tube $V_1$ is taken out across load resistor 29 through low-pass filter 27, and then is reproduced by speaker L after low frequency amplification.

During the negative half cycle of the sub-carrier signal, diode $D_2$ is rendered conductive, and the right signal of the stereo composite signal appears across load resistor 30, through low-pass filter 28 and is reproduced by speaker R after amplification.

Vacuum tube $V_4$ of the indicator circuit is supplied with negative potential from resistor 18 of bistable amplifier $V_2$ that is applied to the control grid 35, and with negative potential from the automatic volume control device to the other control grid 36, resulting in decrease of both anode currents of tube $V_4$. The voltage drops across resistors 37 and 38 are thus decreased, resulting in a raise of the respective anode potentials, and potential differences between respective anode and target electrodes are nullified. Consequently, electrons emitted from respective cathodes bombarded the whole faces of respective anodes uniformly, without being affected by the target electrodes. The anode faces are painted with fluorescent paint, and are rendered wholly luminant by the above-described electron bombardment to indicate that high frequency amplifier 4 is tuned to the broadcast waves and stereo broadcast signal is being received.

When a monaural signal is received, the signal received does not contain a pilot signal, and hence the pilot signal does not appear in the anode circuit of vacuum tube $V_1$. Consequently, grid current flows in bistable amplifier $V_2$ through diode $D_3$ to nullify the amplication effect of the former, and no ouput appears on the output side across transformer 19. As a result, negative voltage is not produced across resistor 18, and diodes $D_6$ and $D_7$ are rendered non-conductive due to positive voltage applied thereto from +B source through resistors 31 and 32, respectively. Thus the portion of the circuit, unnecessary for receiving monaural signal, that is connected to the anode sides of diodes $D_6$ and $D_7$, is effectively disconnected, and the detecting circuit is changed over to monaural signal reception. In this case, the monaural signal appears across load resistors 29 and 30 through diodes $D_1$ and $D_2$, and is reproduced by speakers L and R after amplification.

Even when a stereo signal is received, if the signal strength of the received signal is weak and the pilot signal does not reach the predetermined level, the grid of bistable amplifier $V_2$ cannot be biased negatively enough by such pilot signal, and since bistable amplifier $V_2$ has no amplification effect, there appears no output with no negative voltage across resistor 18. Consequently, diodes $D_6$ and $D_7$ are rendered non-conductive by positive voltage applied thereon from +B source. Thus, sum signal $(L+R)$ only as shown in FIG. 1 appears across load resistors 29 and 30, and is reproduced by speakers L and R after low-frequency amplification, resulting in monaural signal reception.

In this case again, vacuum tube $V_4$ of the indicator circuit is not supplied with negative potential to control grid 35, when bistable amplifier $V_2$ has no amplification effect, and consequently, anode current thereof increases, raising the potential difference between the anode and target electrode. As a result, the target electrode is shadowed on the luminant face of corresponding anode, showing that a monaural signal is being received. The other control grid 36 is supplied with negative potential from the automatic volume control device or automatic gain control device of high frequency amplifier 4, and consequently, there appears no shadow of target electrode on the luminant face of the corresponding anode, indicating that high frequency amplifier 4 is in tuned condition.

Figure 5:
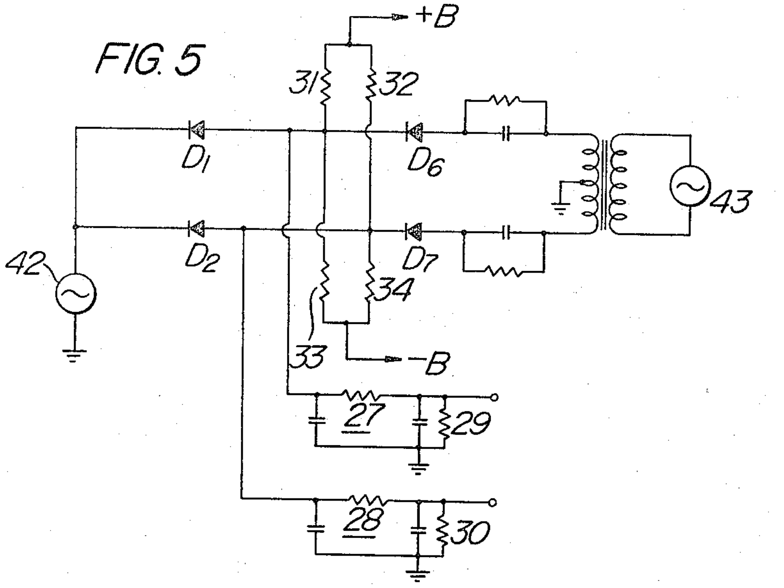
FIG. 5 is a circuit diagram showing the essential portion of FIG. 3.

Referring to FIG. 5 showing the essential portion of the circuit shown in FIG. 3, diodes $D_1$ and $D_6$ and diodes $D_2$ and $D_7$ are connected in series relation, respectively, between signal source 42 to be detected and demodulating sub-carrier wave source 43. Positive potential is applied from +B source to the common joint points of respective series-connected diodes through resistors 31 and 32 respectively. Diodes $D_6$ and $D_7$ are thus rendered non-conductive, and the sub-carrier wave source 43 and associate parts at the anode sides of diodes $D_6$ and $D_7$ are disconnected from the circuit.

When stereo signal is being received and is of such a level as to have stereo sound reproduction effect, diodes $D_6$ and $D_7$ are applied with ample negative voltage from −B source to be rendered conductive, and four diodes $D_1$, $D_2$, $D_6$ and $D_7$ form and operate as a stereo signal detecting circuit. When, however, a monaural signal or a weak stereo signal is being received, diodes $D_6$ and $D_7$ are rendered non-conductive, and the above-mentioned detecting circuit is changed over to monaural signal receiving state. It has, therefore, been understood that, if stereo broadcasting is changed over to monaural broadcasting at the broadcasting station, the receiving circuit embodying the present invention is automatically changed over from stereo detection to monaural reception.

As has heretofore been explained in detail, according to the present invention, the receiver circuit is automatically changed over between stereo detection and monaural reception according to whether the received signal is stereo or monaural. According to the present invention further, diodes $D_6$ and $D_7$ may be used as changing-over switching elements, and in addition, four diodes $D_1$, $D_2$, $D_6$ and $D_7$ form a stereo detecting circuit, so that sub-carrier component may be restrained from leaking out during stereo detection.

I claim as my invention:

1. In a radio receiver for selectively receiving an FM stereo signal and an FM monaural signal, the stereo signal being transmitted by a system in which a left signal L and a right signal R are converted to a sum signal $(L+R)$ and a difference signal $(L-R)$, the difference signal being used for amplitude modulation of a sub-carrier wave to obtain a modulated signal suppressed sub-carrier, the signal frequency band thereof being arranged in the upper band of said sum signal, a main carrier wave frequency modulated by said sum and difference signal and a pilot signal arranged between the frequency bands of said sum and difference signals, and the monaural signal being transmitted by the main carrier wave frequency modulated; the improvement comprising four diodes forming two pairs of two diodes with the diodes in each pair being connected in series with each other and with each pair being inserted in parallel relation with the other respectively between sources of a signal to be detected and of a demodulating sub-carrier wave; a bistable amplifier providing no output when the input signal of the bistable amplifier is below a predetermined level, but providing an output of a constant level when the input signal is beyond said predetermined level; means for supplying bias voltages to respective joint points of the series-connected diodes in each pair to render non-conductive the diodes that are coupled to said demodulating sub-carrier source; means for supplying the pilot signal to said bistable amplifier; means for supplying the output voltage of said bistable amplifier to the joint points, respectively; and means for taking the left and right sound signals out of said joint points, whereby said FM stereo signal and FM monaural signal are automatically selectively reproduced separately.

2. In a radio receiver for selectively receiving an FM stereo signal and an FM monaural signal, the stereo signal being transmitted by a system in which a left signal L, and a right signal R are converted to a sum signal $(L+R)$ and a difference signal $(L-R)$, the difference signal being used for amplitude modulation of a sub-carrier wave to obtain a modulated signal suppressed sub-carrier, the signal frequency band thereof being arranged in the upper band of said sum signal, a main carrier wave frequency modulated by said sum and difference signal and a pilot signal arranged between the frequency bands of said sum and difference signals, and the monaural signal being transmitted by the main carrier wave frequency modulated; the improvement comprising four diodes forming two pairs of two diodes which are connected in series with each other and inserted respectively between sources of a signal to be detected and of a demodulating sub-carrier wave; a bistable amplifier providing no output when the input signal of the bistable amplifier is below a predetermined level, but providing an output of a constant level when the input signal is beyond said predetermined level; means for supplying bias voltages to respective joint points of the series-connected diodes to render non-conductive the diodes that are coupled to said demodulating sub-carrier source; means for supplying the pilot signal to said bistable amplifier; means for supplying the output voltage of said bistable amplifier to the joint points, respectively; an indicator vacuum tube having two grids, two anodes, two target electrodes, and two cathodes; means for supplying the output voltage of said bistable amplifier to one of said control grids of said indicator vacuum tube; means for supplying automatic gain control voltage of a high frequency amplifier to the other control grid of said indicator vacuum tube; and means for taking the left and right sound signals out of said joint points, whereby said FM stereo and FM monaural signal are automatically selectively reproduced separately.

3. In a radio receiver for selectively receiving an FM stereo signal and an FM monaural signal, the stereo signal being transmitted by a system in which a left signal L and a right signal R are converted to a sum signal ($L+R$) and a difference signal ($L-R$), the difference signal being used for amplitude modulation of a sub-carrier wave to obtain a modulated signal suppressed sub-carrier, the signal frequency band thereof being arranged in the upper band of said sum signal, a main carrier wave frequency modulated by said sum and difference signal and a pilot signal arranged between the frequency bands of said sum and difference signals, and the monaural signal being transmitted by the main carrier wave frequency modulated, the improvement comprising a vacuum tube having two diode electrodes, a control grid, an anode and a cathode; means for supplying the sum signal, the modulated signal suppressed sub-carrier and the pilot signal to the control grid of said vacuum tube; two diodes connected in series relation with said diode electrodes, respectively; a bistable amplifier having at least a control grid, an anode and a cathode; means for supplying the pilot signal from the anode of said vacuum tube to the control grid of said bistable amplifier; means for obtaining direct current voltage from the output of said bistable amplifier; means for supplying the sub-carrier signal to said two diodes in push-pull relation; means for supplying bias voltage to the respective points of said series-connected diode electrodes and diodes to render said diodes non-conductive; means for supplying the D.C. output voltage of said bistable amplifier to said joint points; and means for taking the left and right sound signals out of said joint points, whereby said FM stereo signal and FM monaural signal are automatically selectively reproduced separately.

References Cited

UNITED STATES PATENTS

| | | | |
|---|---|---|---|
| 3,187,102 | 6/1965 | Gschwandther | 179—15 |
| 3,175,041 | 3/1965 | Shottenfeld et al. | 179—15 |
| 3,167,615 | 1/1965 | Wilhelm et al. | 179—15 |

DAVID G. REDINBAUGH, *Primary Examiner.*

R. L. GRIFFIN, *Assistant Examiner.*